US008868848B2

(12) United States Patent
Gao et al.

(10) Patent No.: US 8,868,848 B2
(45) Date of Patent: Oct. 21, 2014

(54) SHARING VIRTUAL MEMORY-BASED MULTI-VERSION DATA BETWEEN THE HETEROGENOUS PROCESSORS OF A COMPUTER PLATFORM

(75) Inventors: Ying Gao, Beijing (CN); Hu Chen, Beijing (CN); Shoumeng Yan, Beijing (CN); Xiaocheng Zhou, Beijing (CN); Sai Luo, Beijing (CN); Bratin Saha, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 12/643,803

(22) Filed: Dec. 21, 2009

(65) Prior Publication Data

US 2011/0153957 A1 Jun. 23, 2011

(51) Int. Cl.
*G06F 12/02* (2006.01)

(52) U.S. Cl.
USPC ........... 711/147; 711/154; 711/162; 707/695; 712/32; 712/34

(58) Field of Classification Search
USPC ........ 711/147, 154, 162; 707/695; 712/32, 34
See application file for complete search history.

(56) References Cited

U.S. PATENT DOCUMENTS

| 5,745,906 | A * | 4/1998 | Squibb | 1/1 |
| 6,341,339 | B1 | 1/2002 | Kontothanassis et al. | |
| 6,574,749 | B1 | 6/2003 | Parsons et al. | |
| 7,287,034 | B2 | 10/2007 | Wong et al. | |
| 7,404,056 | B1 * | 7/2008 | Nordquist | 711/166 |
| 7,516,301 | B1 * | 4/2009 | Moreton et al. | 712/28 |
| 7,839,410 | B1 * | 11/2010 | Brown et al. | 345/541 |
| 7,996,359 | B2 * | 8/2011 | Pietraniec et al. | 707/610 |
| 2002/0087500 | A1 | 7/2002 | Berkowitz et al. | |
| 2005/0257211 | A1 * | 11/2005 | Chatterjee et al. | 717/170 |
| 2006/0112226 | A1 * | 5/2006 | Hady et al. | 711/130 |
| 2007/0088766 | A1 * | 4/2007 | Bodge et al. | 707/203 |

(Continued)

FOREIGN PATENT DOCUMENTS

| CN | 1601511 A | 3/2005 |
| CN | 1783033 A | 6/2006 |

(Continued)

OTHER PUBLICATIONS

Sorin et al, "Fast Checkpoint/Recovery to Support Kilo-Instruction Speculation and Hardware Fault Tolerance" Oct. 2000, Technical Report #1420. Retrieved on Sep. 8, 2012 from <http://research.cs.wisc.edu/techreports/2000/TR1420.pdf>.*

(Continued)

*Primary Examiner* — Arpan P. Savla
(74) *Attorney, Agent, or Firm* — Ryder, Lu, Mazzeo and Konieczny, LLC; Douglas J. Ryder

(57) ABSTRACT

A computer system may comprise a computer platform and input-output devices. The computer platform may include a plurality of heterogeneous processors comprising a central processing unit (CPU) and a graphics processing unit (GPU) and a shared virtual memory supported by a physical private memory space of at least one heterogeneous processor or a physical shared memory shared by the heterogeneous processor. The CPU (producer) may create shared multi-version data and store such shared multi-version data in the physical private memory space or the physical shared memory. The GPU (consumer) may acquire or access the shared multi-version data.

16 Claims, 3 Drawing Sheets

(56) References Cited

U.S. PATENT DOCUMENTS

| | | | |
|---|---|---|---|
| 2007/0186069 A1 | 8/2007 | Moir | |
| 2008/0021934 A1 | 1/2008 | Hudson et al. | |
| 2008/0109795 A1* | 5/2008 | Buck et al. | 717/137 |
| 2008/0256330 A1* | 10/2008 | Wang et al. | 712/24 |
| 2010/0125579 A1* | 5/2010 | Pardoe et al. | 707/736 |

FOREIGN PATENT DOCUMENTS

| | | | |
|---|---|---|---|
| JP | 2008158811 A | 7/2008 |
| TW | 200931905 A | 7/2009 |
| WO | 2006/055477 A1 | 5/2006 |
| WO | 2010/056587 A2 | 5/2010 |

OTHER PUBLICATIONS

*Search and Examination Report* for United Kingdom Application No. GB1020733.0 mailed Mar. 17, 2011, 4 pages.

Office Action received for United Kingdom Application No. 1020733.0, mailed on Jun. 29, 2012, 3 pages.

Office Action received for Korean Patent Application No. 2010-0131675, mailed on May 30, 2012, 1 page of English Translation.

Notice of Allowance received for Korean Patent Application No. 10-2010-0131675, mailed on Nov. 27, 2012, 2 pages of Notice of allowance and 1 page of English Translation.

Office Action received for Chinese Patent Application No. 201010601559.1, mailed on Sep. 12, 2012, 7 pages of office action and 9 pages of English Translation.

Office Action Received for United Kingdom Application No. 1020733.0, mailed on Mar. 22, 2012, 2 pages.

Office Action received for Chinese Patent Application No. 201010601559.1, mailed on May 27, 2013, 17 pages of Office Action including 9 pages of English translation.

Office Action received for German Patent Application No. 10 2010 051 477.2, mailed on Jan. 20, 2014, 5 Pages of Office Action and 2 Pages of English Translation.

Notice of Allowance received for GB Patent Application No. 1020733.0, mailed on Oct. 2, 2012, 2 Pages.

Notice of Allowance received for Chinese Patent Application No. 201010601559.1, mailed on Feb. 13, 2014, 2 Pages of Notice of Allowance and 3 Pages of English Translation.

\* cited by examiner

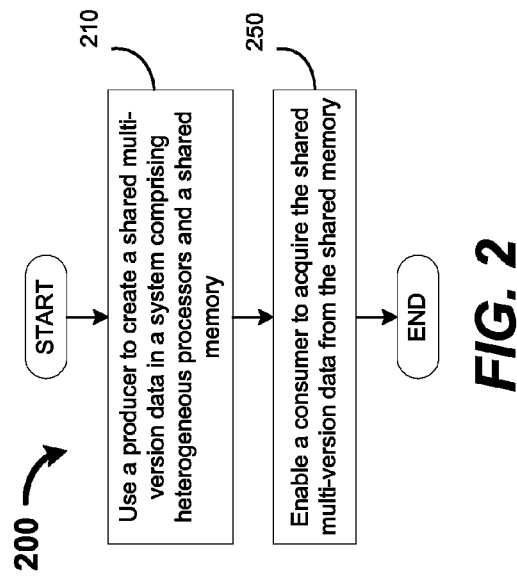
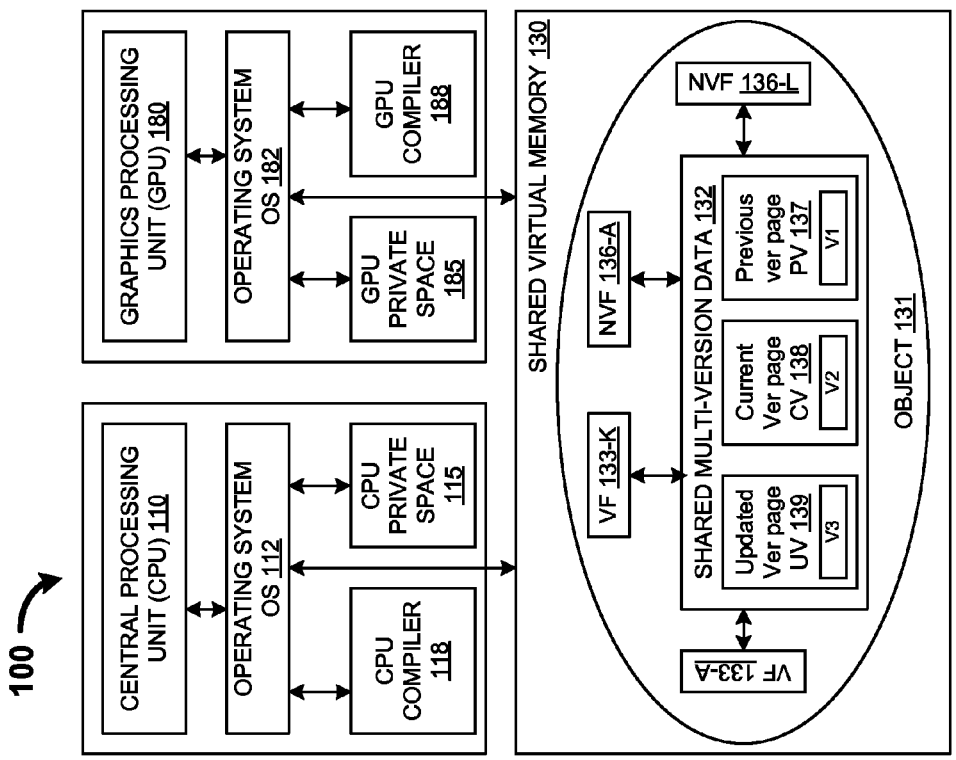

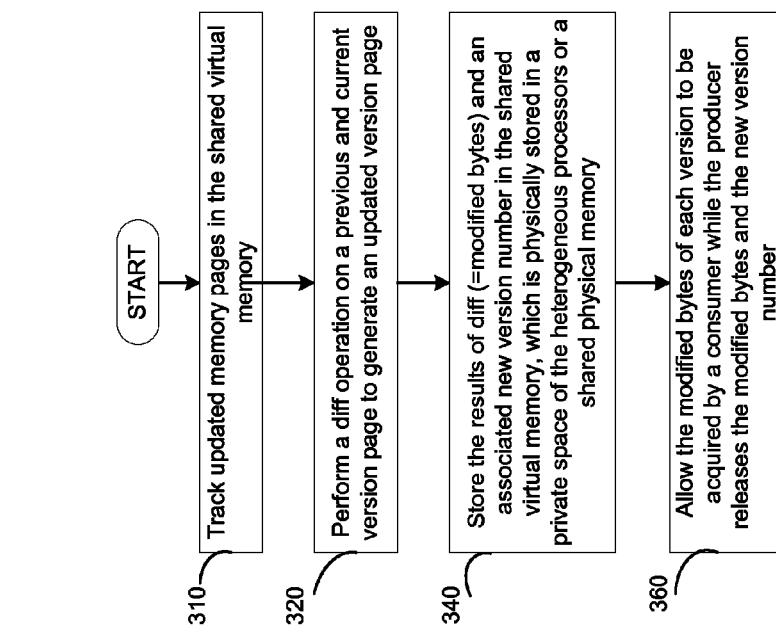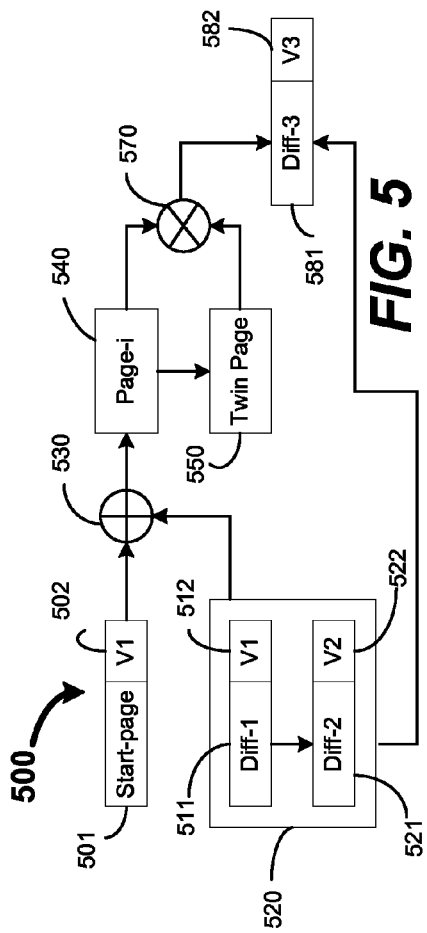

SHARING VIRTUAL MEMORY-BASED MULTI-VERSION DATA BETWEEN THE HETEROGENOUS PROCESSORS OF A COMPUTER PLATFORM

BACKGROUND

Computer systems may comprise platforms supporting heterogeneous processors such as a central processing unit (CPU) and a graphics processing unit (GPU) and symmetric and asymmetric processors. A single version of data may reside in a first memory associated with a first side (e.g., CPU) of a CPU-GPU platform. The second side (GPU side) may be enabled to invoke the single version data that reside in a first memory associated with the first side (CPU side) of the CPU-GPU platform. Also, the first side may not be enabled to invoke the single version data that resides in a second memory on the second side (GPU side). As the single version data may be stored in different address spaces, the existing communication mechanisms may merely allow one-way communication between the heterogeneous processors (CPU and the GPU) to invoke the single version data.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a platform 100 that may support sharing virtual memory based multi-version data between heterogeneous processors such as CPU and GPU in accordance with one embodiment.

FIG. 2 is a flow-chart, which illustrates an operation performed by the platform 100 in accordance with one embodiment.

FIG. 3 is a flow-chart, which illustrates an operation performed by a producer and a consumer of the platform 100 to support sharing virtual memory based multi-version data between heterogeneous processors such as CPU and GPU in accordance with one embodiment.

FIG. 4 is a flow-chart, which illustrates an operation performed by the producer to track updated memory pages in the shared virtual memory space in accordance with one embodiment.

FIG. 5 is a line diagram, which illustrates a 'duff' operation performed by the producer of the platform 100 to provide multi-version data available to be acquired by the consumer in accordance with a first embodiment.

DETAILED DESCRIPTION

Figure 6:
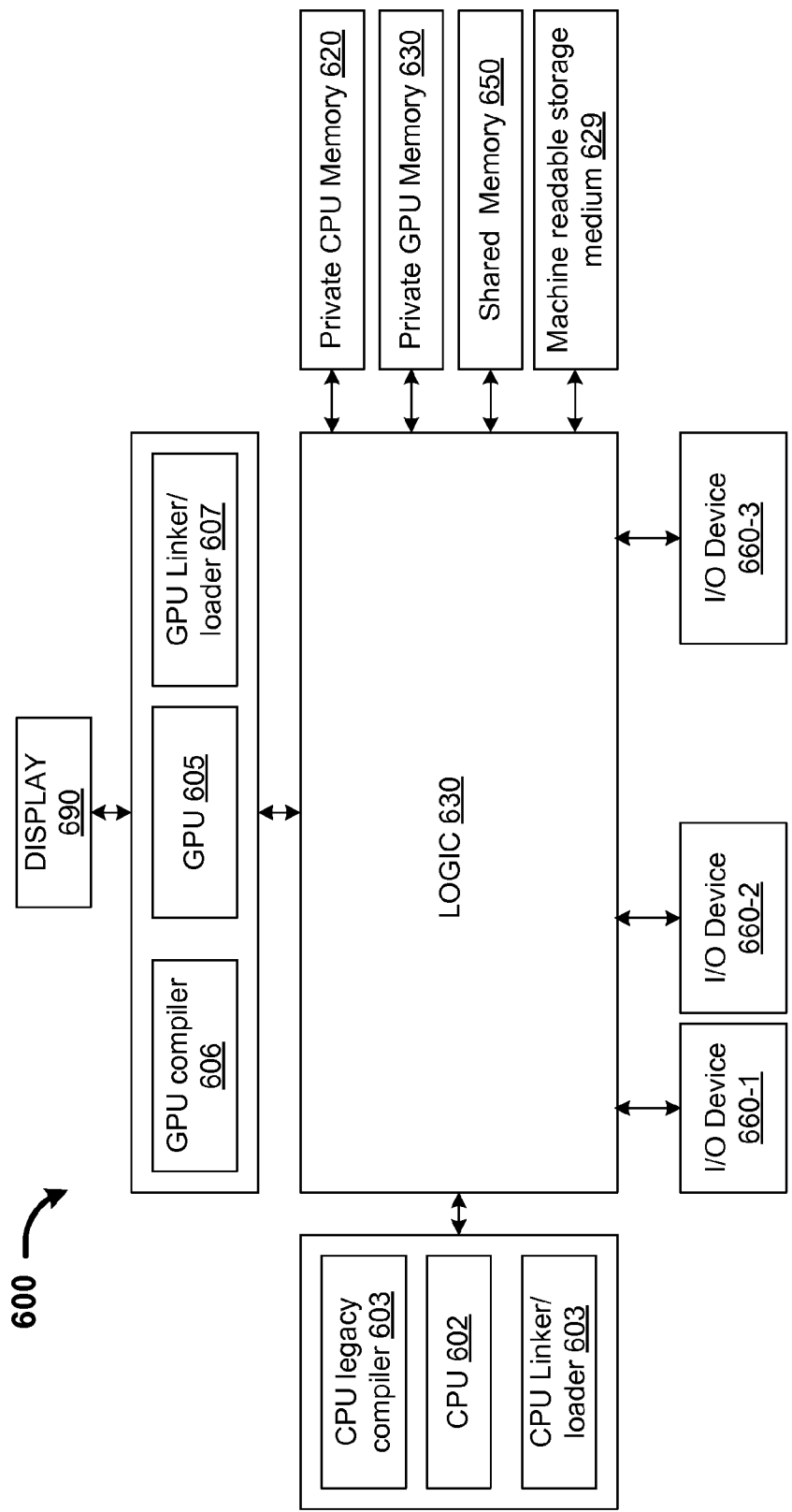
FIG. 6 illustrates a computer system that may include a platform, which may support sharing of virtual memory based multi-version data between the heterogeneous processors of a platform in accordance with one embodiment.

The following description describes techniques to share virtual memory based multi-version data between the heterogeneous processors (CPU and GPU, for example) of a computer platform. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, a computer platform may support one or more techniques to share virtual memory based multi-version data between the heterogeneous processors (e.g., a CPU and a GPU). In one embodiment, a shared memory semantics may provide primitives such as a release operation that may make stores by the CPU or GPU "logically commit" to a shared memory and an acquire operation that may make the CPU or GPU memory "logically sync up" with the shared memory.

In one embodiment, the release operation may track the pages in the shared memory that may be updated (or modified). In one embodiment, a 'duff' operation of a previous version and a current version of the pages may be performed and the result of diff operation and an associated new version number may be stored in to a separate memory region. In one embodiment, to enable tracking of updated (or modified or dirty) pages, the shared virtual memory pages may be set to 'write protection' mode on a release that may also result in trapping to a handler to be created while the page is written. In one embodiment, the handler may be used to create a backup copy of the page (twin page). In one embodiment, an auxiliary storage may be used to mark a location (or a specific bit) to indicate that the page is updated or dirty. As a result, for the data structures released on a producer (say CPU, for example) and acquired on a consumer (say GPU, for example), only modified bytes for each version may be transferred. While the consumer performs an acquire operation on a particular version number, the stored diffs may be merged in order into a private address space of the consumer. In one embodiment, the shared virtual memory may be supported by physical private memory spaces of the heterogeneous processors or a physical shared memory shared by the heterogeneous processors.

An embodiment of a platform 100 providing a shared multi-version data between the heterogeneous processors such as the CPU and the GPU is illustrated in FIG. 1. In one embodiment, the platform 100 may comprise a central processing unit (CPU) 110, an operating system (OS) 112 associated with the CPU 110, a CPU private space 115, a CPU compiler 118, a shared virtual memory (or multi-version shared memory) 130, a graphics processing unit (GPU) 180, an operating system (OS) 182 associated with the GPU 180, a GPU private space 185, and a GPU compiler 188. In one embodiment, the OS 112 may manage resources of the CPU 110 and the CPU private space 115, the GPU 180, and the GPU private space 185. In one embodiment, to support shared virtual memory 130, the CPU private space 115 and the GPU private space 185 may comprise copies of multi-version data. In one embodiment, to maintain memory consistency, the meta-data such as the object 131 may be used for synchronizing the copies stored in the CPU private space 115 and the GPU private space 185. In other embodiment, the multi-version data may be stored in a physical shared memory such as a shared memory 650 (of FIG. 6, described below).

In one embodiment, the CPU compiler 118 and the GPU compiler 188 may be, respectively, coupled to the CPU 110 and the GPU 180 or may be provided remotely on other platforms or computer systems as well. The compiler(s) 118 associated with the CPU 110 may generate a compiled code for the CPU 110 and the compiler(s) 188 associated with the GPU 180 may generate a compiled code for the GPU 180.

In one embodiment, the CPU compiler 118 and the GPU compiler 188 may generate a compiled code by compiling one or more member functions of the objects provided by a user in a high level language such as objected oriented language. In one embodiment, the compiler 118 and 188 may cause an object 131, which may comprise a shared multi-version data 132 to be supported by the shared virtual memory 130 by a producer and acquired from the shared virtual memory 130 by a consumer. In one embodiment, the object 131 supported by the shared virtual memory 130 may comprise the shared multi-version data 132 and one or more member functions such as virtual functions VF 133-A to 133-K and non-virtual functions NVF 136-A to 136-L. In one embodiment, the communication between the CPU 110 and the GPU 180 may be provided by the member functions such as VF 133 and NVF 136 of the shared object 131.

An embodiment of an operation of the platform 100 to support shared virtual memory based multi-version data is illustrated in a flow-chart of FIG. 2. In block 210, the CPU 110 (a producer) may create a multi-version data such as the shared multi-version data 132, which may be supported in the shared virtual memory 130. In one embodiment, the CPU 110 may use VersionDataCommit process to create the shared multi-version data 132. In one embodiment, the CPU 110 may compute the new version number. In one embodiment, the new version number may be generated by incrementing a current version number (CuVerNo). In one embodiment, the new version number may equal (CuVerNo+1).

In one embodiment, if a current page identified by a current version number is updated, the CPU 110 may determine difference content (diff) between a previous version page and a current version page. In one embodiment, the CPU 110 may construct a diff node (or updated version node), which may include the difference content and a new version number. In one embodiment, the CPU 110 may insert the diff node into a diff list. In one embodiment, the shared multi-version data 132 may comprise pages that include previous version pages, current version pages, and updated version memory pages. In one embodiment, an update to a current version page may create an updated version memory page. In one embodiment, the shared multi-version data 132 may be created by the producer (CPU 110) and accessed by a consumer (GPU 180).

In block 250, the consumer (GPU 180) may be enabled to acquire the shared multi-version data 132 supported by the shared virtual memory 130. In one embodiment, the GPU 180 may use VersionDataAcquire process to acquire or access the shared multi-version data 132 supported by the shared virtual memory 130. In one embodiment, the GPU 180 may retrieve a diff list for the current version page and merge the contents of the previous version pages and the current version page. In one embodiment, the merge operation may start from a starting page and all the nodes of the diff list from the version of the start page to the version number may be merged into the starting page, which VersionDataAcquire operation specifies. In one embodiment, the contents that are merged from the previous version pages including a start page to the current version page may be merged into the updated version memory page, which may be accessed or acquired by the GPU 180.

An embodiment of the producer and the consumer performing functions to support sharing of multi-version data stored in a shared memory is illustrated in a flow-chart of FIG. 3. In block 310, the CPU 110 (producer of the shared multi-version data object 131) may track the updated (or modified) version memory pages in the shared virtual memory 130.

In block 320, the CPU 110 may perform a diff operation on the previous version page and the current version page to generate an updated version memory page. In one embodiment, the CPU 110 may generate an updated version page UVP 139 (version number=V3) by performing a 'duff' operation on a previous version page PVP 137 (version number=V1) and a current version page CVP 138 (version number=V2). In one embodiment, the CPU 110 may provide a new version number (V3) associated with the UVP 139.

In block 340, the CPU 110 may logically store the results of diff operation (i.e., UVP 139 and the new version number V3) in a shared (or virtual) memory region, which may be physically stored in the CPU private space 115, for example. In block 360, the CPU 110 may allow the modified bytes of each version to be acquired by the GPU 180. In one embodiment, the CPU 110 may release the modified bytes and the associated version number such that the GPU 180 may acquire the modified bytes using the VersionDataAcquire process as described above.

An embodiment of the producer tracking the updated (or modified) pages in the shared virtual memory 130 is illustrated in a flow-chart of FIG. 4. In block 410, the CPU 110 (producer) may share the updated version memory pages in 'write-protection' mode on release. In one embodiment, as a result of sharing the updated version memory pages in 'write protection' mode a trapping to a handler may be generated while the updated version memory pages may be written.

In block 450, the CPU 110 may create a back-up copy of the updated version memory pages in the handler. In one embodiment, to enable tracking of updated (or modified or dirty) pages such as UVP 139, the CPU 110 may set the UVP 139 to 'write-protection' mode. In one embodiment, the CPU 110 may use a handler to create a backup copy of the UVP 139 (twin page).

In block 480, the CPU 110 may mark an auxiliary storage to indicate that the updated version memory pages may be modified (or dirty). In one embodiment, marking an auxiliary storage may allow the CPU 110 to remember that the updated version memory page is dirty. In one embodiment, the CPU 110 may mark a location (or a specific bit) in an auxiliary storage such as PCI aperture area to indicate that the UVP 139 is an updated or modified or dirty page.

An embodiment of the CPU 110 performing a diff operation as at least a part of the release operation and the GPU 180 performing an acquire operation is depicted in FIG. 5. In one embodiment, the CPU 110 may perform VersionDataCommit( ) function (a part of Release operation) to logically commit the updated version memory pages to the shared virtual memory 130. In one embodiment, the consumer (the GPU 180) may access or acquire the data of page 'i' 540 with a version number equaling V2. In one embodiment, while performing the GetDataRelease( ) function, the CPU 110 may perform a diff operation represented by a difference generator 570 on a page 'i' 540 and a twin page 550, which may be an updated version of the page 'i'. In one embodiment, the page 'i' 540 may represent an unmodified version of a current version page and twin page 550 may represent an updated (or modified) version of the page 'i' 540.

In one embodiment, the result generated by the difference generator 570, which may include only the modified bytes may be stored in a Diff-3 field 581. In one embodiment, the diff field 581 may comprise a Diff-3 as the GPU 180 is acquiring a version-3 data generated using multi-version data until the version-2 (V2). In one embodiment, the new version number such as V3 may be stored in the version identifier field 582. In one embodiment, the Diff-3 field 581 and the associated new version number (=V3) in the version identifier field 582 may be inserted into the diff list.

In one embodiment, while performing the VersionDataAcquire( ) process, the GPU 180 may retrieve the diff list for the page 'i' 540 upto version V2. In on embodiment, the diff list 520 for the page 'i' 540 upto to version V2 may include a Diff-1 field 511 and an associated version number field 512 equaling V1 and a Diff-2 field 521 and an associated version number field 522 equaling V2. In one embodiment, the GPU 180 may merge the diff list 520 with a start page 501 associated with a version number field 502 equaling V1. In one embodiment, the merge operation may be represented by the merge generator 530. In one embodiment, the resultant output of the merge generator 530 may be merged with the contents of page 'i' 540.

In one embodiment, the shared multi-version data structure may be used in many programming fields such as a game application. In one embodiment, an update to a shared multi-version data may logically create a new version of the data without incurring coherence traffic. Besides optimizing the coherence traffic, using the shared multi-version data may avoid the time-consuming operations such as explicit marshalling and unmarshalling of data as a pointer to shared memory may be meaningful in different physical address space of CPU and GPU side.

Also, such an approach may simplify the pipelining data between CPU 110 and GPU 180. In one embodiment, the user may not maintain and implement the pipeline, which is usually the source of bugs. In one embodiment, a shared virtual memory system including a CPU-GPU platform may provide support for programmability and may extend multi-versioned structures to a shared memory system. In one embodiment, the shared multi-version data techniques described below may be used in both discrete and integrated GPU configurations, thus unifying the programming of API across different GPU configurations.

An embodiment of a computer system 600 comprising the heterogeneous processors that support sharing of multi-version data stored in a shared virtual memory is illustrated in FIG. 6. Referring to FIG. 6, the computer system 600 may include a general purpose processor (or CPU) 602 including a single instruction multiple data (SIMD) processor and a graphics processor unit (GPU) 605. The CPU 602, in one embodiment, may perform enhancement operations in addition to performing various other tasks or store a sequence of instructions, to provide enhancement operations in machine readable storage medium 625. However, the sequence of instructions may also be stored in the CPU private memory 620 or in any other suitable storage medium. In one embodiment, the CPU 602 may be associated with a CPU legacy compiler 603 and a CPU linker/loader 604. In one embodiment, the GPU 605 may be associated with a GPU proprietary compiler 606 and a GPU linker/loader 607.

While a separate graphics processor unit GPU 605 is depicted in FIG. 6, in some embodiments, the processor 602 may be used to perform enhancement operations, as another example. The processor 602 that operates the computer system 600 may be one or more processor cores coupled to logic 630. The logic 630 may be coupled to one or more I/O devices 660, which may provide interface the computer system 600. The logic 630, for example, could be chipset logic in one embodiment. The logic 630 is coupled to the memory 620, which can be any kind of storage, including optical, magnetic, or semiconductor storage. The graphics processor unit 605 is coupled through a frame buffer to a display 640.

In one embodiment the CPU 602 (producer, here) and the GPU 605 (consumer, here) may support sharing the multi-version data structure stored in the shared memory 650. In one embodiment, as described above, the CPU 602 may support processes or functions such as VersionDataRelease( ) to create a shared multi-version data and store such data in the shared memory 650. In other embodiment, the shared multi-version data may be stored in private CPU memory 620 and/or private GPU memory 630 as well. In one embodiment, as described above, the GPU 605 (consumer) may support processes or functions such as VersionDataAcquire( ) to acquire the shared multi-version data.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor or as a set of software instructions stored in a machine readable medium.

What is claimed is:

1. A method to be performed in a computer platform having a plurality of heterogeneous processors including at least a first processor and a second processor, the method comprising:

creating multi-version data using the first processor, wherein the multi-version data includes an initial version and at least one additional version, identifying, for each additional version that is created and released, difference content between a current version and a previous version of the multi-version data using the first processor, storing the multi-version data including the initial version and the difference content for each additional version released in a shared virtual memory, wherein the shared virtual memory is accessible to at least a subset of the heterogeneous processors including the first processor and the second processor, and acquiring a particular version of the multi-version data from the shared virtual memory for use by the second processor, wherein the acquiring includes retrieving the initial version and the difference content for each additional version up to the particular version and merging the difference content for each successive additional version into the initial version.

2. The method of claim 1, wherein the storing the multi-version data includes storing the difference content for each additional version released in a separate memory location within the shared virtual memory.

3. The method of claim 2, further comprises generating a new version number for the difference content and storing the new version number with the difference content in the separate memory location within the shared virtual memory.

4. The method of claim 3, further comprising tracking the difference content and associated version numbers stored in the shared virtual memory.

5. The method of claim 1, further comprising releasing an additional version of the multi-version data in write protection mode.

6. The method of claim 5, further comprising creating a back-up copy of the additional version of the multi-version data released in write protection mode, wherein the back-up copy is created in a handler and can be modified.

7. The method of claim 6, further comprising marking an auxiliary storage to indicate that the back-up copy is modified.

8. The method of claim 1, further comprising acquiring an updated version of the multi-version data from the shared virtual memory for use by the second processor, wherein the acquiring includes retrieving the difference content for each additional version after the particular version and merging the difference content for each successive additional version into the particular version.

9. A computer platform comprising:
a plurality of heterogeneous processors that includes a first processor acting as a producer and a second processor acting as a consumer and a shared virtual memory,
wherein the first processor is to
create multi-version data, wherein the multi-version data includes an initial version and at least one additional version,
identify, for each additional version that is created and released, difference content between a current version and a previous version of the multi-version data, and
store the multi-version data including the initial version and the difference content for each additional version released in the shared virtual memory, wherein the shared virtual memory is accessible to at least a subset of the heterogeneous processors including the first processor and the second processor, and
wherein the second processor is to acquire a particular version of the multi-version data from the shared virtual memory, wherein the acquiring includes retrieving the initial version and the difference content for each additional version up to the particular version and merging the difference content for each successive additional version into the initial version.

10. The computer platform of claim 9, wherein the first processor is to store the difference content for each additional version released in a separate memory location within the shared virtual memory.

11. The computer platform of claim 10, wherein the first processor is to further generate a new version number for the difference content and to store the new version number with the difference content in the separate memory location within the shared virtual memory.

12. The computer platform of claim 11, wherein the first processor is to track the difference content and associated version numbers stored in the shared virtual memory.

13. The computer platform of claim 9, wherein the first processor is to release an additional version of the multi-version data in write protection mode.

14. The computer platform of claim 13, wherein the first processor is to create a back-up copy of the additional version of the multi-version data released in write protection mode, wherein the back-up copy is created in a handler and can be modified.

15. The computer platform of claim 14, wherein the first processor is to mark an auxiliary storage to indicate that the back-up copy is modified.

16. The computer platform of claim 9, wherein the second processor is to acquire an updated version of the multi-version data from the shared virtual memory, wherein the acquiring includes retrieving the difference content for each additional version after the particular version and merging the difference content for each successive additional version into the particular version.

* * * * *